United States Patent [19]
Penrose et al.

[11] 3,988,075
[45] Oct. 26, 1976

[54] NUCLEAR FUEL ELEMENT

[75] Inventors: Richard T. Penrose, Los Gatos; John R. Thompson, San Jose, both of Calif.

[73] Assignee: General Electric Company, San Jose, Calif.

[22] Filed: Mar. 2, 1973

[21] Appl. No.: 337,547

Related U.S. Application Data

[62] Division of Ser. No. 253,299, May 15, 1972.

[52] U.S. Cl. .............................. 417/48; 252/181.5
[51] Int. Cl. .............................................. G21c 3/02
[58] Field of Search ............ 252/181.5; 417/48, 49, 417/51; 176/68

[56] References Cited
UNITED STATES PATENTS

| | | | |
|---|---|---|---|
| 3,141,830 | 7/1964 | Klepfer | 176/68 |
| 3,214,381 | 10/1965 | Baldauf et al. | 417/49 |
| 3,229,147 | 1/1966 | Affleck | 417/49 |
| 3,466,226 | 9/1969 | Lass | 176/68 |
| 3,519,537 | 7/1970 | Ferrari | 176/68 |
| 3,542,488 | 11/1970 | Hall | 417/49 |

FOREIGN PATENTS OR APPLICATIONS

1,000,931  8/1965  United Kingdom .................. 176/68

*Primary Examiner*—William L. Freeh
*Attorney, Agent, or Firm*—Ivor J. James, Jr.; Sam E. Laub; Samuel E. Turner

[57] ABSTRACT

A method of protecting the cladding of a nuclear fuel element from internal attack and a nuclear fuel element for use in the core of a nuclear reactor are disclosed. The nuclear fuel element has disposed therein an additive of a barium-containing material and the barium-containing material collects reactive gases through chemical reaction or adsorption at temperatures ranging from room temperature up to fuel element plenum temperatures. The additive is located in the plenum of the fuel element and preferably in the form of particles in a hollow container having a multiplicity of gas permeable openings in one portion of the container with the openings being of a size smaller than the size of the particles. The openings permit gases and liquids entering the plenum to contact the particles. The additive is comprised of elemental barium or a barium alloy containing one or more metals in addition to barium such as aluminum, zirconium, nickel, titanium and combinations thereof.

6 Claims, 3 Drawing Figures

NUCLEAR FUEL ELEMENT

This is a division of application Ser. No. 253,299, filed May 15, 1972.

BACKGROUND OF THE INVENTION

This invention relates broadly to an improvement in nuclear fuel elements for use in the core of nuclear fission reactors, and more particularly to improved nuclear fuel elements having disposed therein an additive of a barium-containing material positioned in the plenum of the fuel element and capable of collecting gases through chemical reaction or adsorption.

Nuclear reactors are presently being designed, constructed and operated in which the nuclear fuel is contained in fuel elements which may have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves two primary purposes: first, to prevent contact and chemical reactions between the nuclear fuel and either the coolant, or moderator if present, or both; and second, to prevent the radioactive fission products, some of which are gases, from being released from the fuel into the coolant, or moderator if present, or both. Common cladding materials are stainless steel alloys, aluminum and its alloys and zirconium and its alloys. The failure of the cladding, due to the build-up of gas pressure or other reasons, can contaminate the coolant or moderator and the associated systems with radioactive long-lived products to a degree which interferes with plant operation.

Problems have been encountered in the manufacture and in the operation of nuclear fuel elements which employ certain metals and alloys as the clad material due to the reactivity of these materials under certain circumstances. Zirconium and its alloys, under normal circumstances, are excellent materials as a nuclear fuel cladding since they have low neutron absorption cross sections and at temperatures below about 600° F are extremely stable and non-reactive in the presence of demineralized water or steam which are commonly used as reactor coolants and moderators. Within the confines of a sealed fuel rod, however, the hydrogen gas generated by the slow reaction between the cladding and residual water may build up to levels which under certain conditions can result in localized hydriding of the alloy with concurrent deterioration in the mechanical properties of the cladding. The cladding is also adversely affected by such gases as oxygen, nitrogen, carbon monoxide and carbon dioxide at reactor operating temperatures.

The zirconium cladding of a nuclear fuel element is exposed to one or more of the gases given above during irradiation in a nuclear reactor in spite of the fact that these gases may not be present in the reactor coolant or moderator, and further may have been excluded as far as possible from the ambient atmosphere during manufacture of the cladding and the fuel element. Sintered refractory and ceramic compositions, such as uranium dioxide and others used as nuclear fuel, release measurable quantities of the aforementioned gases upon heating, such as during fuel element manufacture and especially during irradiation. Particulate refractory and ceramic compositions, such as uranium dioxide powder and other powders used as nuclear fuel, have been known to release even larger quantities of the aforementioned gases during irradiation. These gases react with the zirconium clad material containing the nuclear fuel. This reaction can result in the embrittlement of the cladding which endangers the integrity of the fuel element. Although water and water vapor may not react directly to produce this result, at high temperatures water vapor does react with zirconium and zirconium alloys to produce hydrogen and this gas further reacts locally with the zirconium and zirconium alloys to cause embrittlement. These undesirable results are exaggerated by the release of these residual gases within the sealed metal clad fuel element since it increases the internal pressure within the element and thus introduces stresses in the presence of corrosive conditions not anticipated in the original design of the clad tube.

In the electronics industry, various electronic components have been designed to incorporate a "getter" to chemically combine with the residual traces of gas in the component. A getter is also used to maintain the purity of the vacuum in evacuated electronic components. This is a less expensive means of protecting the electronic component than using vacuum drawing equipment to completely evacuate an electronic component. Materials commonly employed as getters in electronic components are barium and barium alloys such as barium-aluminum alloys. Barium and barium alloys are particularly suited for this use because these materials are sufficiently stable to permit safe handling during the assembly of the electronic component and yet are sufficiently reactive to effectively tie up the residual gases. Barium is the most widely used active metallic material for flash-type getters in electronic components.

Bulk-contact getters are used in higher temperature environments in limited volumes where a getter flash is impractical. The bulk getters, to be effective, must run hot, but are not flashed. Metals, or mixtures of metals used in bulk getters include thorium, titanium, cesium, zirconium, uranium, tantalum, hafnium, niobium, lanthanum, or mixtures of rare earth elements such as misch metal.

In light of the foregoing, it has been found desirable to minimize water, water vapor and other gases reactive with the cladding within the interior of the fuel element throughout the time the nuclear fuel is used in the operation of nuclear power plants. One such approach has been to find materials which will chemically react rapidly and combine with or absorb water, water vapor and other reactive gases to eliminate these from the interior of the cladding. While several getters for water and water vapor have been found, such as the zirconium-titanium getter set forth in U.S. Pat. No. 2,926,981, it has remained desirable to develop a getter having equal or greater rapidity of reaction with moisture and gases, and having the feature of rapidly reacting at temperatures encountered in nuclear fuel element fabrication.

It has been determined that in one preferred practice a getter in particulate form should be held in a container which will insure retention of not only the original particles of the alloy but also any reaction products of the alloy which could have much smaller average particle size. It has also been determined that the container for holding the alloy in particulate form should be easy to load, should be capable of being fabricated to given dimensions within close tolerances and should be relatively resistant to deformation during handling.

SUMMARY OF THE INVENTION

It has been surprisingly found that a particulate form of barium or a barium alloy (hereinafter both also referred to as a barium-containing material) disposed in the plenum of a nuclear fuel element can protect the integrity of a nuclear fuel element and prevent attack of the cladding by effectively gettering water, water vapor and gases reactive with the cladding. This results in a new combination of a nuclear fuel element containing an additive of a barium-containing material reacting with water, water vapor and reactive gases at temperatures ranging from room temperature up to fuel element plenum temperatures. In a preferred embodiment the getter of a barium-containing material is in particulate form and is held in a hollow container having a multiplicity of gas permeable openings in a portion of the container which is located in the plenum of the nuclear fuel element. In this manner the barium material is disposed in one of the coolest locations in the fuel element during reactor operation and this location substantially eliminates any reversal of the gettering reaction of the barium-containing material with water, water vapor and reactive gases. The container holding the barium-containing material insures retention of not only the original particles of the barium material but also any reaction products of the alloy which could have much smaller average particle size, and the container is easy to load, can be fabricated to given dimensions and is substantially resistant to deformation during handling.

OBJECTS OF THE INVENTION

It is an object of this invention to provide a method of protecting the cladding of a nuclear fuel element from internal attack by incorporating an additive of barium-containing material in the nuclear fuel element.

It is another object of this invention to provide an improved nuclear fuel element having a getter comprising barium or a barium alloy located in a low temperature region of a nuclear fuel element and in a physical form suitable for rapid reaction with water, water vapor and reactive gases.

Still another object of this invention is to provide an improved method for the manufacture of metal clad nuclear fuel elements which, as assembled, include a getter of a barium-containing material disposed in the plenum of the fuel element for efficient protection of the cladding of the fuel element.

A further preferred object of this invention is to provide a nuclear fuel element with a getter of a barium-containing material in particulate form in a container having a multiplicity of gas permeable openings in one portion of the container with the container being located in the plenum of the fuel element.

The foregoing and other objects of this invention will become apparent to a person skilled in the art from reading the following specification and the appended claims with reference to the accompanying drawings described immediately hereinafter.

DESCRIPTION OF THE INVENTION

Figure 1:
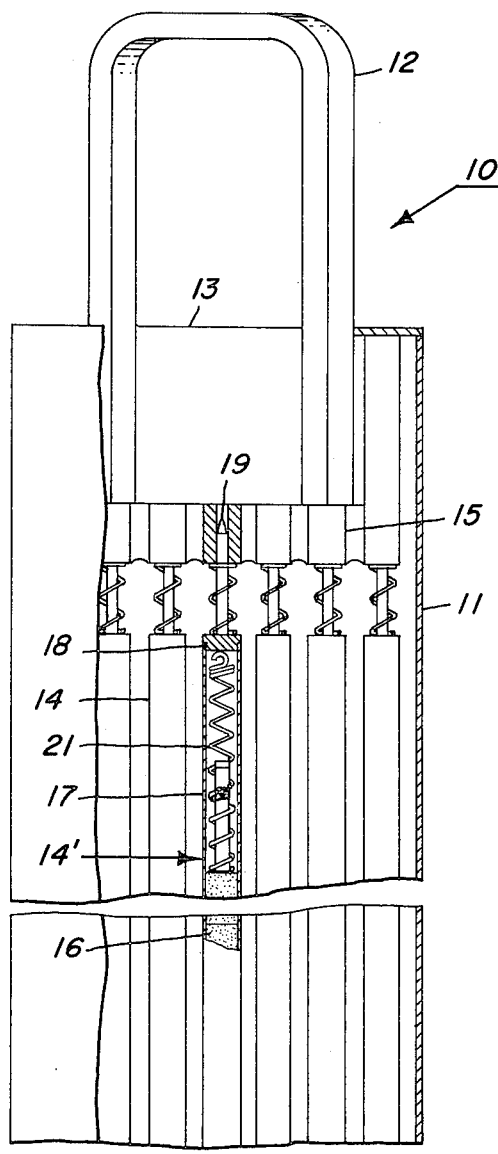
FIG. 1 presents a partial sectional view of a nuclear fuel assembly containing nuclear fuel elements constructed according to the teachings of this invention with one element shown in partial sectional view.

Referring now more particularly to FIG. 1, there is shown a partially cutaway sectional view of a nuclear fuel assembly 10. This fuel assembly consists of a tubular flow channel 11 of generally square cross section with a lifting bale 12 extending above channel 11 and a nose piece at the lower end of channel 11 (not shown due to the lower portion of assembly 10 being omitted). The upper end of channel 11 is open at 13 and the lower end of the nose piece is provided with coolant flow openings. An array of fuel elements 14 is enclosed in channel 11 with one fuel element 14 being shown in partial section, and the array is supported therein by means of upper end plate 15 and a lower end plate (not shown due to the lower portion being omitted). The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors at elevated temperatures.

Figure 2:
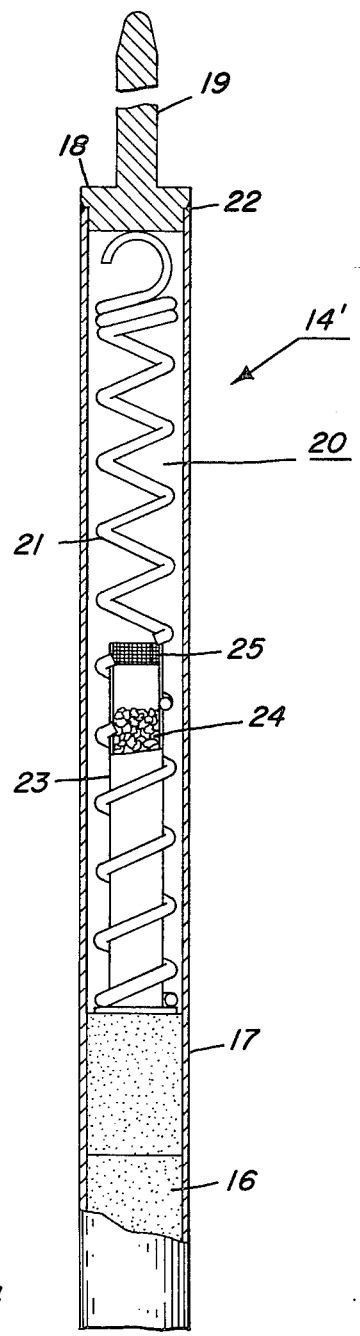
FIG. 2 shows a cutaway view of the plenum or cavity portion of a nuclear fuel element illustrating the location of the getter in a gas permeable container located inside a helical member in the plenum.

Referring now to FIG. 2 in addition to FIG. 1, a nuclear fuel element or rod 14 is shown in partial sectional view constructed in accordance with the teachings of this invention. The fuel element includes fuel material 16, here shown as a plurality of fuel pellets of fissionable and/or fertile material positioned within a structural cladding or container 17. In some cases the fuel pellets may be of various shapes; in other cases different fuel forms such as particulate fuel may be used. The physical form of the fuel is immaterial to this invention. Various nuclear fuel materials may be used including uranium compounds, plutonium compounds, thorium compounds, and mixtures thereof. A preferred fuel is uranium dioxide or a mixture comprising uranium dioxide and plutonium dioxide. The container is sealed at its ends by means of end plugs 18 which may include studs 19 to facilitate the mounting of the fuel rod in the assembly. A cavity or plenum 20 is provided at one end of the fuel element to permit longitudinal expansion of the fuel material and accumulation of gases released from the fuel material. A helical member 21 is positioned within space 20 and serves to maintain the position of the fuel during handling and transportation of the fuel elements. Cladding 17 is secured to end plugs 18 by means of circumferential welds 22. Common cladding materials are stainless steel alloys, aluminum and its alloys and zirconium and its alloys.

The fuel element is designed to provide an excellent thermal contact between the fuel cladding and the fuel material, a minimum of parasitic neutron absorption and resistance to bowing and vibration which is occasionally caused by flow of the coolant at high velocity.

Figure 3:
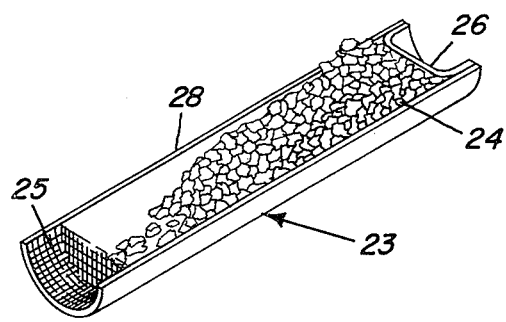
FIG. 3 shows the gas permeable container in section holding the getter of a barium-containing material in particulate form.

Referring to FIGS. 2 and 3, there is positioned in the plenum 20 inside helical member 21 (preferably a stainless steel helical member 21), a hollow container 23, preferably a metallic container such as a stainless steel container, having a multiplicity of gas permeable openings in one portion of the container, preferably one end or cap 25 of the container, permitting gases and liquids entering the plenum 20 to enter the container 23. In container 23 is disposed an additive of a getter 24 comprised of barium or barium alloys containing one or more metal alloying components in addition to barium such as aluminum, zirconium, nickel, titanium and combinations of the foregoing. The getter is preferably in particulate form, to maximize the surface area per unit weight of the getter available to react with the gases and liquids entering container 23.

Generally the alloying components will constitute up to 15 weight percent of the alloy with the balance being barium. However certain advantageous alloys above 15 weight percent are also contemplated in this invention. One such preferred alloy is about 50 weight percent aluminum with the balance being barium; another such alloy is about 10 weight percent nickel, about 40 weight percent aluminum with the balance being barium; and still another such alloy is about 15 to about 20 weight percent zirconium with the balance being barium.

While FIGS. 2 and 3 present a preferred embodiment of the getter of this invention, additional physical forms of the getter can be utilized in plenum 20 including foil, sheet, films, wire, rod, bar and combinations of the foregoing. These other physical forms may be placed in the plenum, preferably inside the helical member 20 and preferably in a container such as stainless steel container 23.

The container 23 in FIGS. 2 and 3 is preferably in the form of a right circular cylinder although any other configuration for the container is suitable. One end or cap 26 and the cylindrical wall portion 28 are solid metal, preferably a stainless steel, and the other end or cap 25 is preferably a screen material and preferably stainless steel screen of about 400 to about 32 mesh. The container is assembled by welding, brazing or otherwise sealing the solid end and the screen end into the hollow cylindrical wall portion 28. The ends or caps 25 and 26 are preferably concave or recessed into the cylinder as shown in FIG. 3 to facilitate welding. An effective amount of the getter is charged into the container with one end open, preferably the screen end open, and an end closure is then effected typically by spot welding. Preferably about 5 ± 1 grams of getter are used in a fuel rod containing about 5 kilograms of sintered nuclear fuel material (or generally about one gram of getter per kilogram of fuel material). Larger quantities of getter are used in powder fuel rods and in fuel rods suspected of containing large amounts of deleterious gases.

The preferred use of the getter container 23 disclosed herein results in additional advantages. The container 23 insures retention of the particulate getter and any reaction products resulting from reaction of the getter with reactive gases in the fuel element. In this manner particulate material from the plenum will not be capable of entering the portion of the fuel element occupied by the nuclear fuel and the getter reaction products will be retained in the plenum, the lower temperature portion of the fuel element. This keeps the getter reaction products at lower temperatures and minimizes the chance of exposing the reaction products to higher temperatures tending to release the reactive gases combined to form the reaction product. The container 23 is easy to load, can be fabricated within very close dimensional tolerances, and has excellent dimensional stability due to the strength of the metal forming the cylindrical wall portion. Further the strength of the metal forming the cylindrical wall portion minimizes deformation of the container during handling and assembly of the fuel element. In another embodiment of the container, one or more openings can be made in one portion of the cylindrical wall portion 28 to give gases access to the getter. This embodiment may retain the screen end cap 25 or have a solid end cap replace the screen end cap 25.

The getter used in the nuclear fuel element of this invention and its properties will now be described in detail.

It has been discovered that a material suitable for controlling moisture and other reactive gases by chemically combining with such gaseous materials, namely a getter, should have a combination of properties. One desirable property is the minimization of any free hydrogen after the chemical reaction of the getter with water, as the minimization of free hydrogen prevents any possible hydride failures of cladding for nuclear fuel elements. Thus the getter should react approximately stoichiometrically with the water and water vapor (both herein called water) and in such a way that there is a negligible net source of hydrogen from the reaction. The getter should also rapidly react with the water at the temperature prevailing in the system in which the getter is utilized. The getter should generally have a low neutron cross section and be inexpensive to fabricate. The getter should also have the property of reacting with hydrogen, other reactive gases such as carbon monoxide, carbon dioxide, oxygen, nitrogen, and hydrogen-containing compounds such as hydrocarbons.

Barium and the barium alloys disclosed herein have the foregoing properties and can be readily purchased or fabricated in a form of small particles having a Tyler Screen mesh size in the range of about No. 1 to No. 8, giving a high surface area for reaction with any reactive gases present in the fuel element. Barium alloys containing one or more metals in addition to barium such as aluminum, zirconium, nickel, titanium and combinations thereof can be readily obtained commercially and when available in the foregoing size range provide a high surface area reactive with any reactive gases present in the fuel element.

The impurity content of the barium-containing materials is not critical to the development of the foregoing getter properties and substantial amounts of impurities can be included in the fabricated barium-containing materials as long as the surface of the barium-containing materials has barium effectively exposed for reaction. In practice it has been discovered that oxygen contents up to several thousand parts per million in the barium-containing materials are tolerable. Nitrogen contents up to about 750 parts per million are tolerable in utilization of the barium-containing materials. The other impurities found in the barium-containing materials used in this invention which do not hinder their use as getters in nuclear fuel rods include hydrogen and carbon. Metallic impurities found in the barium-containing materials which do not hinder use of the barium-containing materials as getters are hafnium in amounts up to about 1000 parts per million or more, iron in amounts up to about 1000 parts per million or more and chromium in amounts up to about 1000 parts per million or more. The fact that the impurity content of the barium-containing materials is not critical to their utilization as moisture getters enables fabrication of the barium-containing materials from corresponding low-grade metallic components. Since the barium-containing materials are utilized in the plenum of the fuel elements, small amounts of impurities of high neutron absorption cross section offer negligible interference.

The barium-containing materials used in this invention have the property of reacting with water for long periods of time at a rapid rate of reaction over a temperature range of about room temperature (typically about 70° F) up to fuel element plenum temperature (typically 650° ± 100° F) without becoming passive. During reaction with water, the barium-containing materials leave substantially no free hydrogen so cladding used in association with the getters of this invention would be exposed to substantially no hydrogen thereby eliminating formation of metallic hydrides which ultimately lead to weakening or failure of the cladding. This minimum release of hydrogen during the reaction of the barium-containing materials with water indicates a substantially stoichiometric reaction of the barium-containing materials with water. Studies indicate that the barium-containing materials used in this invention readily react with hydrogen over a temperature range of room temperature to reactor operating temperatures so that these materials are efficient hydrogen getters. The barium-containing materials also react with hydrogen-containing compounds such as hydrocarbons and with other gases such as nitrogen, carbon dioxide, carbon monoxide and oxygen. The barium-containing materials have a low neutron cross section required for use in nuclear applications when the impurities having high neutron cross section are minimized.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. A method of protecting the cladding of a nuclear fuel element from internal attack comprising the step of incorporating in the fuel element an effective amount of an additive selected from the group consisting of barium and barium alloys.

2. A method according to claim 1 in which the cladding is a zirconium alloy.

3. A method according to claim 1 in which the additive is comprised of barium.

4. A method according to claim 1 in which the additive is a barium alloy.

5. A method according to claim 1 in which the additive is disposed in the plenum of the fuel element.

6. A method according to claim 1 in which the additive is in particulate form and is held in a gas permeable container.

* * * * *